United States Patent [19]

Shinagawa et al.

[11] 4,323,374
[45] Apr. 6, 1982

[54] AIR FILTER ASSEMBLY

[75] Inventors: Takehisa Shinagawa, Sakai; Tsunehiko Inoue, Towdabayashi, both of Japan

[73] Assignee: Nitta Belting Co., Ltd., Osaka, Japan

[21] Appl. No.: 86,449

[22] Filed: Oct. 19, 1979

[30] Foreign Application Priority Data

May 4, 1979 [JP] Japan ................... 54-54974

[51] Int. Cl.³ .................. B03C 9/02; B01D 50/00
[52] U.S. Cl. ..................... 55/132; 55/155; 55/156; 55/486; 55/489; 55/521; 55/DIG. 39
[58] Field of Search ........... 55/103, 131, 132, 155, 55/156, 486, 488, 489, 521, DIG. 39, 528

[56] References Cited

U.S. PATENT DOCUMENTS

| | | | |
|---|---|---|---|
| 2,931,748 | 4/1960 | Müller | 55/486 |
| 2,973,830 | 3/1961 | Gruner | 55/103 |
| 3,073,094 | 1/1963 | Landgraf et al. | 55/131 |
| 3,117,849 | 1/1964 | Selke | 55/131 |
| 3,242,649 | 3/1966 | Rivers | 55/132 |
| 3,307,332 | 3/1967 | Grace et al. | 55/103 |
| 4,011,067 | 3/1977 | Carey, Jr. | 55/528 |
| 4,215,682 | 8/1980 | Kubik et al. | 55/DIG. 39 |

FOREIGN PATENT DOCUMENTS

| | | | |
|---|---|---|---|
| 1507871 | 1/1970 | Fed. Rep. of Germany | 55/486 |
| 2412995 | 10/1975 | Fed. Rep. of Germany | 55/132 |
| 606602 | 5/1978 | U.S.S.R. | 55/103 |

*Primary Examiner*—David L. Lacey
*Attorney, Agent, or Firm*—Koda and Androlia

[57] ABSTRACT

An air filter assembly including an electret filter sheet of material which exhibits electrical charges of opposite sign on opposite faces thereof and a non-electret conventional filter sheet of material combined with and disposed upstream from the electret filter sheet of material, whereby particles of a large diameter are collected by the non-electret filter sheet of material and particles of a small diameter are collected by the electret filter sheet of material without causing clogging or air pressure loss.

6 Claims, 8 Drawing Figures

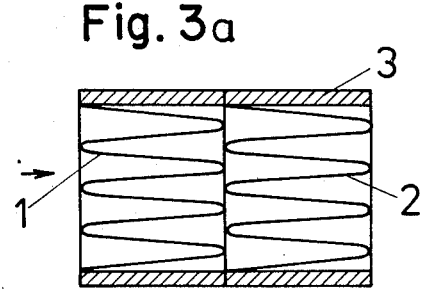
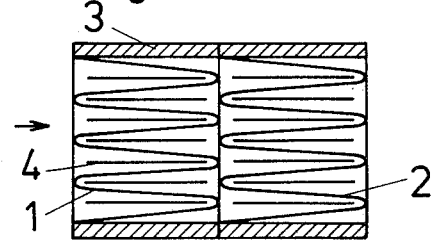
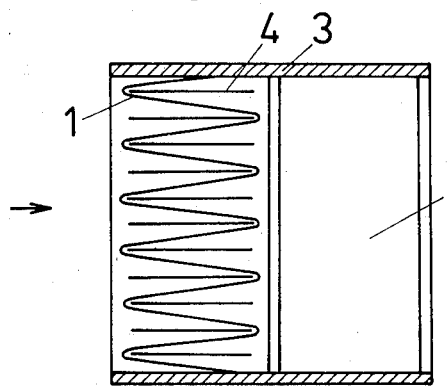
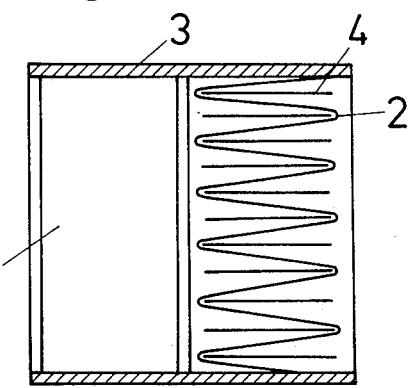
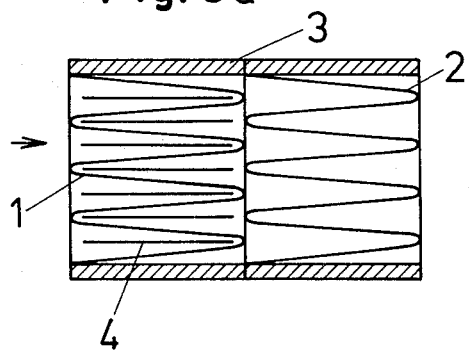
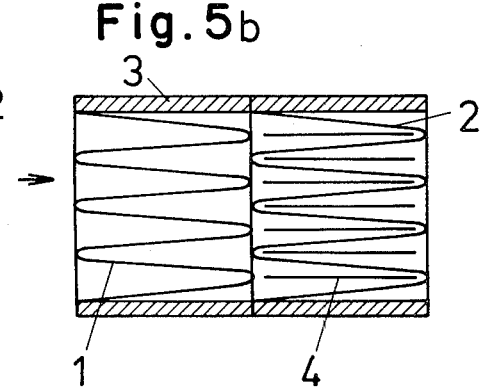

AIR FILTER ASSEMBLY

BACKGROUND OF THE INVENTION

1. Field of the Invention

This invention relates to an air filter, and more particularly to an air filter of a combination of electret filters and non-electret filters to have a high efficiency for removing particles, dust, etc. in the air.

The term "electret" is employed throughout the specification to denote an electrified substance which exhibits electrical charges of opposite sign on opposite faces, the electrification being throughout the entire volume of the substance, rather than merely on its surface.

2. Prior Art

Recently, there has been an increasing demand for air filters of high efficiency which can remove even undesirable particles such as ultrafine corpuscles out of the air. The demand is raised particularly in factories for manufacturing IC (integrated circuits) and LSI (large-scale integrated circuits), operation rooms and treatment rooms in hospitals, and preparation rooms for medicine and the like. In such places, the so-called clean room system has conventionally been employed to minimize entry of dust or microbes brought by people entering the rooms and so forth, so that the air to be supplied into the rooms is first filtered for purification by air filters and then blasted from coiling (vertical laminar flow system) or through walls (horizontal laminar flow system).

However, especially in the field of IC and LSI production, further development toward still smaller size, and higher density and precision has been under way, and for the improvements of quality and performance, accuracy in insulation at a gap less than 0.3 $\mu$m is brought into question, while in hospitals also, attention is now directed to microbes less than 0.3 $\mu$m in size. Thus, removal of these ultrafine particles has been strongly required. More specifically, the conventional clean rooms which are provided with clean air projectors equipped with conventional high efficiency air filters (HEPA filter) having collecting efficiency higher than 99.97% for the fine particles on the order of 0.3 $\mu$m in diameter, the cleanness does not meet requirements, because it shows only class 1 or 100 at most (i.e. the number of particles in 1 ft of air is 1 or 100 respectively, on the basis of U.S. Federal Standards 209b) with respect to the fine particles having diameter larger than 0.5 $\mu$m. Therefore, the higher grade clean room, i.e. the so-called super clean room of class 1 or 100 to fine particles smaller than 0.3 $\mu$m, for example to ultrafine particles or 0.1 $\mu$m has come to be required.

An electrostatic precipitator or electrostatic filter conventionally available which might be employed for the requirement described above is not only high in the cost of installation of power sources, but insufficient in dust removing efficiency against the ultrafine particles.

Moreover, only one sheet of HEPA filter does not provide sufficient dust removal efficiency against the ultra-fine particles. In order to overcome the disadvantages as described above, it was naturally considered to improve the dust collecting efficiency either by piling up more than two sheets of the filter or by increasing the density thereof. In this case however, although the dust removing efficiency is improved, the pressure loss becomes very large. In addition, not only facilities such as blowers, ducts, etc. become bulky, but power charge must be increased, which is not practical or reliable.

In the above connection, since the conventional high efficiency air filter depends on particle collection by mechanical filtering effect, it may be possible to collect fine particles if a gap between the fibers is further reduced, or if the filter has smaller pores in diameter. However, even by the above arrangement, the drawbacks as described earlier can not be avoided, while filter clogging tends to take place, causing pressure loss, and resulting in a short life of the filter.

SUMMARY OF THE INVENTION

Therefore, it is a principal object of this invention to provide an air filter which substantially eliminates disadvantages inherent in conventional air filters thereby having a high efficiency in removing any kind of particles in the air without causing clogging.

In keeping with the principles of this invention, the object is accomplished by an unique air filter which is a combination of electret filter and non-electret filter.

By way of example, when one sheet of HEPA filter as a non-electret filter and one sheet of electret filter are piled together, particles larger than 0.3 $\mu$m are collected by the electret filter, and therefore, a filter extermely high in collecting efficiency and small in pressure loss can be obtained. It is to be noted here that since the electret filter collects the particles not by mechnically fine screen, but by attracting the suspended particles onto the surface of fibers through coulomb force resulting from the surface potential possessed thereby, the filter does not suffer from clogging or pressure loss. Then the combined filter having an electret filter positioned on the downstream side of the HEPA filter can provide a unique air filter having extremely high efficiency with a very small additional pressure loss.

BRIEF DESCRIPTION OF THE DRAWINGS

The above mentioned features and objects will become more apparent with reference to the following description taken in conjunction with the following drawings wherein like elements are given like reference numerals and in which:

FIGS. 3 (a) and (b) are cross-sectional views of other embodiments of this invention;

FIG. 4 (a) is a cross-sectional view of another embodiment of this invention and 4 (b) is a lateral cross-sectional view of 4 (a);

FIGS. 5 (a) and 5 (b) are cross-sectional views of other embodiments of this invention;

DETAILED DESCRIPTION OF THE INVENTION

Figure 1A:
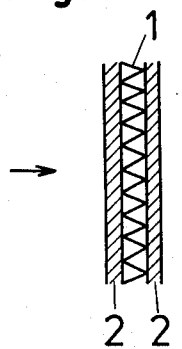
FIGS. 1 (a) to (g) are cross-sectional views of varied embodiments of the air filter in accordance with the teachings of this invention.
Figure 1B:
Figure 1C:
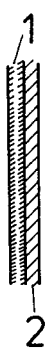
Figure 1D:
Figure 1E:
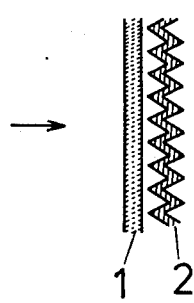
Figure 1F:
Figure 1G:
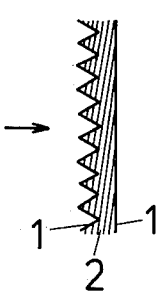

The electret to be employed in the present invention is generally formed into the shape of a sheet. In the electret in having the form of a sheet, there are cases where one surface thereof is charged to a positive polarity and the other surface to a negative polarity, or where respective surfaces thereof constituting fibers or granules are charged to both positive and negative polarities (for example, in the case where after electretizing fibers, the electret is formed into woven fabric or non-woven fabric sheets).

The electret can be formed into a shape other than a a sheet for example, into a granular shape, and charged particules among the suspended particles are attracted onto the surface of the electret charged in different polarity by the coulomb force, etc. arising from the surface potential possessed thereby, while neutral particles are also attracted to the surface nearby through electrostatic induction. Moreover, the electret to be employed in the present invention may be prepared by incorporating into box-like member, fabrics or porous structures such as non-woven fabrics, expanded material or porous material having continuous bubles and also granualr electret and the like, which are piled up into more than one sheet by the number required or folded into zigzag shapes, etc. for application.

On the other hand, conventional non-electret filters may consist of medium efficiency air filters (for example, National Bureau of Standards NB95 filter) or high efficiency air filters (HEPA filters), etc. which may be folded into zigzag shapes.

Referring more particularly to the drawings, shown in FIG. 1 is a first embodiment of an air filter in accordance with the teachings of this invention. In FIG. 1 (a), a conventional non-electret filter 1 is formed in a zigzag shape and placed between two filters 2 which are provided at both the upstream side and downstream side of the non-electret filter 1. An arrow shows the direction of air flow. In FIG. 1 (b), the electret filter 2 is provided only at downstream side of the non-electret filter 1. In FIG. 1 (c), the non-electret filter 1 is formed in a sheet shape. In FIG. 1 (d), both non-electret filter 1 and electret filter 2 are formed in a zigzag shape. In FIG. 1 (e), the non-electret filter 1 is in a sheet shape, while the electret filter 2 is in a zigzag shape. In FIG. 1 (f), the zig-zag type electret filter 2 is covered at both of upstream and downstream sides by thin non-electret, zigzag shaped filters 1. In FIG. 1 (g), the non-electret filter 1 at the downstream side of FIG. 1 (f) is formed into a thin sheet shape. Accordingly, the downstream side of the electret filter 2 is flat.

As discussed above, the electret filter may be installed on the upstream side and downstream side thereof, but it is preferable to dispose the electret filter at least on the downstream side to utilize advantageous points of both filters so as to obtain a filter of favorable characteristics. Particles having diameter larger than 0.3 μm are collected by the conventional filter at the upstream side, while ultrafine particles are caught by the electret filter downstream side as confirmed by the experiments carried out by the present inventors. As stated before, the electret filter has inherently very low pressure loss, and therefore, the combination with a HEPA filter shows only a small additional pressure loss increase. Simultaneously, it has also been confirmed that the pressure loss is small where the electret fitler is disposed at the downstream side. As shown in the FIGS. 1 (a), 1 (b), 1 (d), 1 (e), 1 (f) and 1 (g). by forming the filter in a zigzag shape, the collecting efficiency can be improved at a small increase in the pressure loss, although there is some increase in thickness.

It is to be noted here that in FIG. 1 (f) and (g), the non-electret filter 1 at the downstream side may be modified to be a supporting member for supporting the electret filter 2 disposed therebetween. Furthermore, a filter element may be of such a type as contain electretized fabrics within the conventional filter. That is to say, the filter element may be of a mixed type of electretized fibers and conventional filter fabrics. Moreover, it is possible to utilize an element having a construction in which electret in a powder or granular shape is enclosed in a sheet form conventional filter.

Subsequently, improvements on the performance by use of the air filters actually constructed according to the present invention will be described hereinbelow with reference to experimental data.

It is to be noted that EXAMPLES are inserted here for the purpose of illustrating the present invention without any invention of limiting the scope thereof.

EXAMPLE 1

Figure 2A:
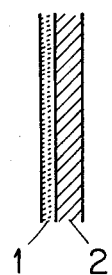
FIGS. 2 (a) to (c) are cross-sectional views of varied embodiments of the air filter employed for EXAMPLE 1 to 3.
Figure 2B:
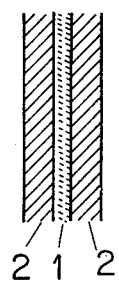
Figure 2C:
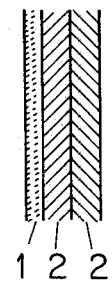

At the downstream side of one sheet of HEPA filter as described below, one sheet of electret filter having properties as follows was installed, the arrangement of which is shown in FIG. 2 (a).

| HEPA filter: | (HEPA . . . High Efficiency Particulate Air) |
|---|---|
| Material | Glass fibers |
| Thickness | 0.4 mm |
| Gain in weight | 80 g/m² |
| Pressure loss | 10 cm/S 56 mmWG |
| Electret filter: | |
| Material | Polypropylene Fibers |
| Thickness | 5 mm |
| Gain in weight | 400 g/m² |
| Pressure loss | 10 cm/S 7mmWG |

EXAMPLE 2

Two sheets of electret filters as described below were disposed, with one sheet of the following HEPA filter held therebetween, the arrangement diagram of which is shown in FIG. 2 (b).

| HEPA filter: | |
|---|---|
| The same one as used in EXAMPLE 1. | |
| Electret filter: | |
| Material | Polypropylene fibers |
| Thickness | 4 mm |
| Gain in weight | 300 g/m² |
| Pressure loss | 10 cm/S 5mmWG |

EXAMPLE 3

Two sheets of electret filters as described below were installed at the downstream side of one sheet of NB95 filter having properties as follows, the arrangement diagram of which is shown in FIG. 2 (c).

| NB95 filter: | (NB . . . National Bureau of Standard |
|---|---|
| Material | Glass fibers |
| Thickness | 0.4 mm |
| Gain in weight | 90 g/m² |
| Pressure loss | 10/cm/S 11 mmWG |
| Electret filter: | |
| The same one as used in Example 1. | |

The result of performance comparison are tabulated in Table 1 below:

TABLE 1

|  | Conventional filters | | | | | Electret filters | |
| --- | --- | --- | --- | --- | --- | --- | --- |
|  | EXAMPLES | | | HEPA | HEPA | NB95 | Weight gain | Weight gain |
|  | 1 | 2 | 3 | 1 sheet | 2 sheets | 1 sheet | 400 g/m² | 300 g/m² |
| Pressure loss 10 cm/S (mmWG) | 63 | 66 | 26 | 56 | 112 | 16 | 7 | 5 |
| Penetration % |  |  |  |  |  |  |  |  |
| 0.111 μm Particle | 0.00 | 0.00 | 0.00 | 0.20 | 0.09 | 45.2 | 0.01 | 0.93 |
| 0.29 μm Particle | 0.00 | 0.00 | 0.00 | 0.01 | 0.00 | 13.4 | 0.00 | 0.06 |

With respect to the penetration as described above, the number of particles in 100 cc at air flow rate of 10 cm/S was measured at the downstream side and upstream side of the filter element, with the ratio being represented in %. For the measuring instrument, PMS laser aerosol spectrometer was employed.

As is clear from the results of experiments as described above, according to the present invention, a novel filter element having by far the superior filter effect as compared with the conventional filters or with the case where only the electret filter was used, has been advantageously obtained. In the foregoing EXAMPLES, although the gain in weight of the filter formed into the electret was set to be 300 g/m² at the lower side, even with the filter having gain in the weight less than the above, (for example, at 200 g/m²), particles having diameter as small as 0.111 μm could be perfectly removed.

Since the PMS laser aerosol spectrometer capable of measuring particles at 0.111 μm has the highest performance in measuring instruments, particles smaller in diameter than the above level could not be measured. However, it is surmised that particles smaller than 0.111 μm have been removed by a considerable amount since particles of 0.111 μm are completely eliminated after passing through the filter element according to the present invention, as is clear from the above data.

Subsequently, the filter construction mainly employed for a super clean room will be described hereinbelow.

The arrangement shown in FIG. 3 (a) is an embodiment corresponding to FIG. 1 (d), and has such a construction that the high performance sheet form conventional filter 1 and sheet form electret filter 2 respectively formed into zigzag shapes are disposed so as to be fixed at their edges to a frame 3 by suitable means.

Meanwhile, the arrangement shown in FIG. 3 (b) is generally similar to that in FIG. 3 (a), and is so constructed that the high performance sheet form conventional filter 1 disposed at the upstream side and the electret filter 2 disposed at the downstream side are each formed into a zigzag shape through corresponding spacers 4 made of aluminum and the like arranged one by one, with the edges of the filters being secured to the frame 3 by suitable means.

Installing the air filters having constructions as described above at the blast hole for the clean room, the polluted air is formed into highly purified air substantially free from dust and microbes, and blasted into the clean room.

FIGS. 4 (a) and 4 (b) shows a slight modification of the arrangement of FIG. 3 (b). In the arrangement of FIG. 4 (a) and 4 (b) the sheet form conventional filter 1 of zigzag shape and the electret filter 2 of zigzag shape are disposed at right angles with respect to each other.

More specifically FIG. 4 (a) shows a cross-sectional view thereof with the plane of cross-section parallel to the spacers 4 of the electret filter 2, while FIG. 4 (b) shows a cross-sectional view thereof with the plane of cross-section parallel to the spacers 4 of the filter 1.

Referring now to FIG. 5, the arrangement of FIG. 5 (a) has a construction in which at the upstream side, the high performance sheet form conventional filter 1 formed into a zigzag shape through corresponding spacers 4 arranged one by one is fixed at its edges to frame 3 by suitable means in the similar manner as in FIG. 3 (b) while at the downstream side, the sheet form electret filter 2 formed into a zigzag shape is fixed at its edges to the frame 3 also by suitable means in the similar manner as in FIG. 3 (a). On the other hand, the arrangement of FIG. 5 (b) is so constructed that at the upstream side the high performance sheet form conventional filter 1 formed into a zigzag shape is fixed at its edges to the frame 3 by suitable means in the similar manner as in FIG. 3 (a), while at the downstream side, the sheet form electret filter 2 formed into a zigzag shape through corresponding spacers 4 arranged one by one is secured at its edges to the frame 3 by suitable means in the similar manner as in FIG. 3 (b).

Figure 6:
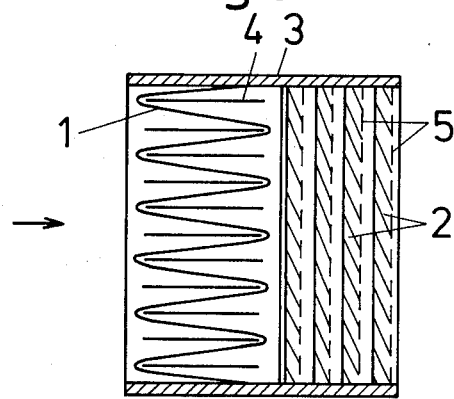
FIG. 6 is a cross-sectional view of another embodiment of this invention.

In the arrangement of FIG. 6, at the upstream side, the high performance sheet form conventional filter 1 formed into a zigzag shape through corresponding spacers 4 of aluminum and the like arranged one by one is secured at its edges to the frame 3 by suitable means in the similar manner as in FIG. 3 (b), while at the downstream side, there is disposed the electret filter 2 prepared by filling electret fibers and the like in the form of cotton into the frame 3 at a suitable density. The numeral 5 indicates a suitable number of support members for supporting said fibers, etc. which are members of comb-like shape of wood, plastics, or metallic material, wire mesh or porous plate, etc.

Figure 7:
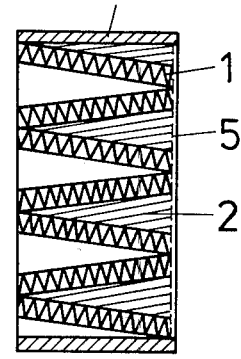
FIG. 7 is a cross-sectional view of another embodiment of this invention.

Moreover, in the arrangement of FIG. 7, the high performance conventional filter 1 folded into a zigzag shape is accommodated in the frame 3 so as to be further folded again in a zigzag manner for being fixed at its peripheral edges to the frame 3, with the respective sheet faces of said filter 1 being arranged at approximately right angles with respect to the direction of air flow. Meanwhile, the electret filter 2 made of cotton-like electret fibers, etc. is filled into wedge-like spaces at the downstream of the filter 1 at a proper density. Indicated by numeral 5 are support members for supporitng the earlier mentioned fibers and the like, which are members of comb-like shape made of wood, plastics, or metallic material, wire mesh or porous plate, etc.

Figure 8:
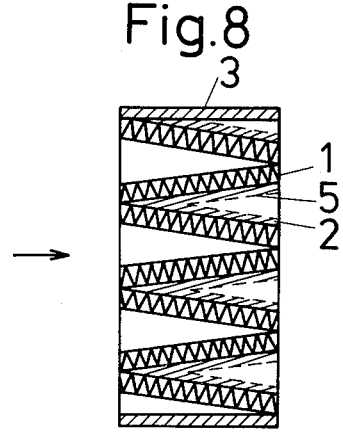
FIG. 8 is a cross-sectional view of another embodiment of this invention.

Furthermore, in the construction of FIG. 8, the high performance conventional filter 1 folded into a zigzag shape is housed in the frame 3 so as to be further folded again in a zigzag manner for being fixed at its peripheral edges to the frame 3, with the respective sheet faces of said filter 1 being also directed approximately at right angles with respect to the direction of air flow. Meanwhile, the electret filter 2 made of cotton-like electret fibers, etc. is filled into spaces provided along the filter 1 at the downstream of the filter 1 at a proper density. In this arrangement, numeral 5 shows support members for supporting the earlier mentioned electret filter, which are members of comb-like shape made of wood, plastics, or metallic material, wire mesh or porous plate, etc. In the filter as described above, since the rear portions of the support members 5 are provided with wedge-like space, and consequently less amount of electret filter is required than in case of FIG. 7 the filter element can be economically produced at a low cost without reduction in performance.

We claim:

1. An air filter assembly comprising:
    a frame for supporting filter sheets, said frame having input and output ends;
    a first filter sheet of HEPA material provided in said frame adjacent to said input end of said frame, said first filter sheet of HEPA material being substantially free of an electrical charge; and
    a second filter sheet of material provided in said frame, positioned between said first filter sheet and said output end of said frame, said second filter sheet being made from dielectric material, said second filter sheet further having one surface with a positive charge thereon and another surface with a negative charge thereon.

2. An air filter assembly according to claim 1, wherein the one surface and the another surface of the second filter sheet comprise fibers respectively charged to positive and negative polarities.

3. An air filter assembly according to claim 1, wherein said second filter sheet of material is made from a single material.

4. An air filter assembly according to claim 3, wherein said second filter sheet of material is made from polypropolene.

5. An air filter assembly according to claims 3 or 4, wherein at least one of said first and second filter sheets of material is formed in a zig-zag shape.

6. An air filter assembly according to claims 3 or 4, wherein said first and second filter sheets of materials are formed in a zig-zag shape.

* * * * *